(12) United States Patent
Komatsu et al.

(10) Patent No.: US 6,947,222 B2
(45) Date of Patent: Sep. 20, 2005

(54) PROJECTION LENS AND PROJECTION IMAGE DISPLAY APPARATUS

(75) Inventors: Akira Komatsu, Tastuno machi (JP); Akihiro Shimizu, Minowa machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/821,254

(22) Filed: Apr. 9, 2004

(65) Prior Publication Data

US 2004/0257666 A1 Dec. 23, 2004

(30) Foreign Application Priority Data

Apr. 10, 2003 (JP) ........................................ 2003-106599
Jan. 22, 2004 (JP) ........................................ 2004-014911

(51) Int. Cl.⁷ ................................................ G02B 9/00
(52) U.S. Cl. ........................................ 359/651; 359/649
(58) Field of Search ................................ 359/649–651

(56) References Cited

U.S. PATENT DOCUMENTS 5,822,129 A * 10/1998 Sekine ........................ 359/651
6,034,824 A * 3/2000 Moon ......................... 359/651

FOREIGN PATENT DOCUMENTS

| EP | 1 422 543 A1 | 5/2004 |
|---|---|---|
| JP | 05-107469 A | 4/1993 |
| JP | 09-096759 A | 4/1997 |
| JP | 10-307332 A | 11/1999 |
| JP | 11-305117 A | 11/1999 |
| JP | 2001-021799 A | 1/2001 |
| JP | 2001-42211 | 2/2001 |
| JP | 2001-042211 A | 2/2001 |
| JP | 2001-166205 | 6/2001 |
| JP | 2001-324675 | 11/2001 |
| JP | 2002-031754 A | 1/2002 |
| JP | 2002-107618 | 4/2002 |
| JP | 2002-131636 | 5/2002 |
| JP | 2003-5069 | 1/2003 |
| JP | 2003-015033 A | 1/2003 |
| JP | 2003-057540 A | 2/2003 |

* cited by examiner

Primary Examiner—Georgia Epps
Assistant Examiner—William Choi
(74) Attorney, Agent, or Firm—Sughrue Mion, PLLC

(57) ABSTRACT

A projection lens, which has a first group of lenses having a negative power and a second group of lenses having a positive power, sequentially arranged from an enlargement side to a reduction side, satisfying the following conditional expressions (1) through (4), and having a field angle of about 110° or more: (1) $25.0<Fb$, (2) $F<0.65H$, (3) $30F<|EP|$, and (4) $4F<T$, where Fb is an air-converted distance (mm) from a final surface at the reduction side of the lens to an image point, H is a maximum image height (mm) at the reduction side, F is a focal distance (mm) of the whole projection lens, EP is a exit pupil distance (mm), and T is an air-converted distance (mm) obtained by air-converting a gap between the first group of lenses and the second group of lenses.

9 Claims, 9 Drawing Sheets

PROJECTION LENS AND PROJECTION IMAGE DISPLAY APPARATUS

BACKGROUND OF THE INVENTION

1. Field of the Invention

The present invention relates to a retrofocus type projection lens with high performance suitable as a projection lens of a projection image display apparatus for enlarging and projecting an image on a display screen of a liquid crystal display device or a micro mirror device (DMD), etc., and a projection image display apparatus employing the projection lens.

This application is based on Japanese Patent Applications Nos. 2003-106599 and 2004-014911 filed on Apr. 10, 2003 and Jan. 22, 2004, respectively, the disclosures of which are incorporated herein by reference in their entirety.

2. Description of Related Art

A projection image display apparatus such as a front projection image display apparatus in which a projection lens is positioned at the same side as an observer with respect to a screen and a rear projection image display apparatus in which a projection lens and an observer are positioned with interposing a screen therebetween are known.

Among them, the rear projection image display apparatus receives a light source, a screen, and elements therebetween in a housing in order to reduce influence of external light, and applies the light to the screen at a front surface of the housing from the projection lens at a back surface. Enlargement of a display screen and decrease of the total depth of an apparatus have been required for the rear projection image display apparatus.

For this reason, a configuration capable of downsizing the apparatus by allowing mirrors provided in the housing to reflect the light emitted from the projection lens and thus folding a light path is well known. However, in the rear projection image display apparatus comprising the mirrors in the housing, large-size flat mirrors and high rigid frame for supporting the mirrors are required, thereby causing the cost of an apparatus to go up.

In the rear projection image display apparatus, minimizing the size of a television body is required along with the enlargement of a display screen. In order to satisfy these requirements, it is necessary to increase a field angle of the projection lens and decrease a focal distance of the projection lens.

In the projection lens, since a prism used for color composition or lighting is interposed between the lens and a display device, a long back-focus is required for the lens, and since characteristics of the prism are not varied in the screen, it is required that a reduction side of the lens is telecentric. For this reason, in order to increase the field angle of the projection lens, the projection lens should have a retrofocus type configuration comprising a front group of lenses having a negative power and a rear group of lenses having a positive power, and the powers of the front group of lenses and the rear group of lenses should be enhanced, whereby the symmetry of the lenses about an iris is deteriorated remarkably and correction of various aberrations is made difficult.

Many retrofocus type projection lenses with an aim of increasing the field angle and with a long lens back were conventionally suggested, and are disclosed in, for example, Japanese Unexamined Patent Application Publication No. 2001-42211, Japanese Unexamined Patent Application Publication No. 2003-15033 and Japanese Unexamined Patent Application Publication No. 2003-57540. All of the above mentioned publications are incorporated herein by reference for their helpful background information on previous attempts to generate an aspheric surface quickly and accurately.

However, in the conventional design examples, the field angle in Japanese Unexamined Patent Application Publication No. 2001-42211 is 92°, the field angle in Japanese Unexamined Patent Application Publication No. 2003-15033 is 100°, and the field angle in Japanese Unexamined Patent Application Publication No. 2003-57540 is 81°. As a result, sufficient increase of the field angle has not been accomplished. Therefore, the projection distance is still large, and thus it is not possible to decrease the depth of the projection image display apparatus.

SUMMARY OF THE INVENTION

The present invention has been made in view of the above-mentioned limitations. Accordingly, it is an aspect of the present invention to provide a high-performance projection lens capable of further increasing a field angle and which is excellent in correcting various aberrations.

Furthermore, another aspect of the present invention is to provide a projection image display apparatus with a small depth employing the high-performance projection lens having a large field angle and a small projection distance.

In order to solve the above-described problems and to accomplish the aforementioned aspects of the present invention, a projection lens for enlarging an image on a display surface and projecting the enlarged image onto a screen in accordance with the present invention comprising a first group of lenses having a negative power and a second group of lenses having a positive power, which are sequentially arranged from an enlargement side to a reduction side, satisfying the following conditional expressions (1) to (4), and having a field angle of about 110° or more:

$$25.0 < Fb, \tag{1}$$

$$F < 0.65H, \tag{2}$$

$$30F < |EP|, \tag{3}$$

and $$4F < T, \tag{4}$$

where Fb is an air-converted distance (mm) from a final surface at the reduction side of the lens to an image point, H is a maximum image height (mm) at the reduction side, F is a focal distance (mm) of the whole projection lens, EP is a exit pupil distance (mm), and T is an air-converted distance (mm) obtained by air-converting a gap between the first group of lenses and the second group of lenses.

By satisfying the conditional expressions (1) to (4), a distance required for the back-focus can be secured, so that it is possible to prevent color heterogeneity on the screen and to fold a light path, and a large field angle of about 110° or more can be accomplished, so that it is possible to effectively correct various aberrations.

To further solve the above-described problems, the projection lens consistent with the present invention further satisfies the following conditional expressions (5) and (6):

$$-3.5 < F_1/F < -1.5, \tag{5}$$

and $$3.0 < F_2/F < 5.5, \tag{6}$$

where $F_1$ is a focal distance (mm) of the first group of lenses, and $F_2$ is a focal distance (mm) of the second group of lenses.

By satisfying the conditional expressions (5) and (6), a power distribution in the first group of lenses and the second group of lenses can be properly performed, so that it is possible to secure the correction of aberrations.

To further solve the above-described problems, the projection lens according to the present invention, similar to the projection lens described above and where the first group of lenses includes at least one aspheric lens, and when a shape difference between an approximate spherical surface and an aspheric surface is referred to as an aspheric amount, the aspheric amount of the aspheric lens is 0.5 mm or more.

By using the aspheric lens having a large aspheric amount, various aberrations such as astigmatism, field curvature, distortion, etc. can be effectively corrected, thereby implementing a high-performance projection lens.

To further solve the above-described problems, the projection lens in accordance with the present invention provides, similar to the projection lens described above, and where the aspheric lens is a hybrid lens obtained by bonding a resin layer to a surface of a raw material for a glass lens.

Since the hybrid lens can easily accomplish the aspheric amount of 0.5 mm or more, the number of lenses required for the first group of lenses can be reduced, so that it is possible to lower the cost of production.

Also, there is provided, the projection lens in accordance with the present invention, similar to the above-described lens, and wherein the second group of lenses includes at least one aspheric lens and at least one cemented lens.

By constructing the second group of lenses in such way, it is possible to effectively correct the chromatic aberration.

Also there is provided, the projection lens in accordance with the present, similar to the projection lens described above, and wherein the cemented lens includes at least one lens having a positive power and one lens having a negative power, and satisfying the following conditional expressions (7) and (8):

$$0.15<|Np-Nn|, \quad (7)$$

and $$30<|Vp-Vn|, \quad (8)$$

where Np is a refractive index of the lens having a positive power, Nn is a refractive index of the lens having a negative power, Vp is an Abbe number of the lens having a positive power, and Vn is an Abbe number of the lens having a negative power.

By using the cemented lens satisfying the conditional expressions (7) and (8), it is possible to effectively correct a chromatic aberration.

In addition, there is provided a projection lens similar to the projection lens described above and, wherein light path folding means for folding a light path is provided between the first group of lenses and the second group of lenses.

By folding the light path in the projection lens, the projection device can be prevented from being protruded toward a back side of the screen, so that it is possible to downsize the whole apparatus.

It is further provide in accordance with the present invention, the projection lens similar to the projection lenses are, wherein color composition means is provided between the final surface at the reduction side of the second group of lenses and the image point.

Since the projection lens according to the present invention can secure a long back-focus, it is possible to arrange the color composition means at the backside of the second lens.

It is further provided that a projection image display apparatus in accordance with the present invention has a projection lens for enlarging an image on a display surface and projecting the enlarged image onto a screen, wherein the projection lens comprises a first group of lenses having a negative power and a second group of lenses having a positive power, which are sequentially arranged from an enlargement side to a reduction side, satisfying the following conditional expressions (1) to (4), and having a field angle of about 110° or more:

$$25.0<Fb, \quad (1)$$

$$F<0.65H, \quad (2)$$

$$30F<|EP|, \quad (3)$$

and $$4F<T, \quad (4)$$

where Fb is an air-converted distance (mm) from a final surface at the reduction side of the lens to an image point, H is a maximum image height (mm) at the reduction side, F is a focal distance (mm) of the whole projection lens, EP is a exit pupil distance (mm), and T is an air-converted distance (mm) obtained by air-converting a gap between the first group of lenses and the second group of lenses.

By employing a high-performance projection lens having a super large field angle and a small projection distance, the present invention can be used as a projection image display apparatus with a small depth.

BRIEF DESCRIPTION OF THE DRAWINGS

In order to understand the invention and to see how it may be carried out in practice, illustrative, non-limiting embodiments will now be described, with reference to the accompanying drawings, in which.

DETAILED DESCRIPTION OF THE INVENTION

Figure 1:
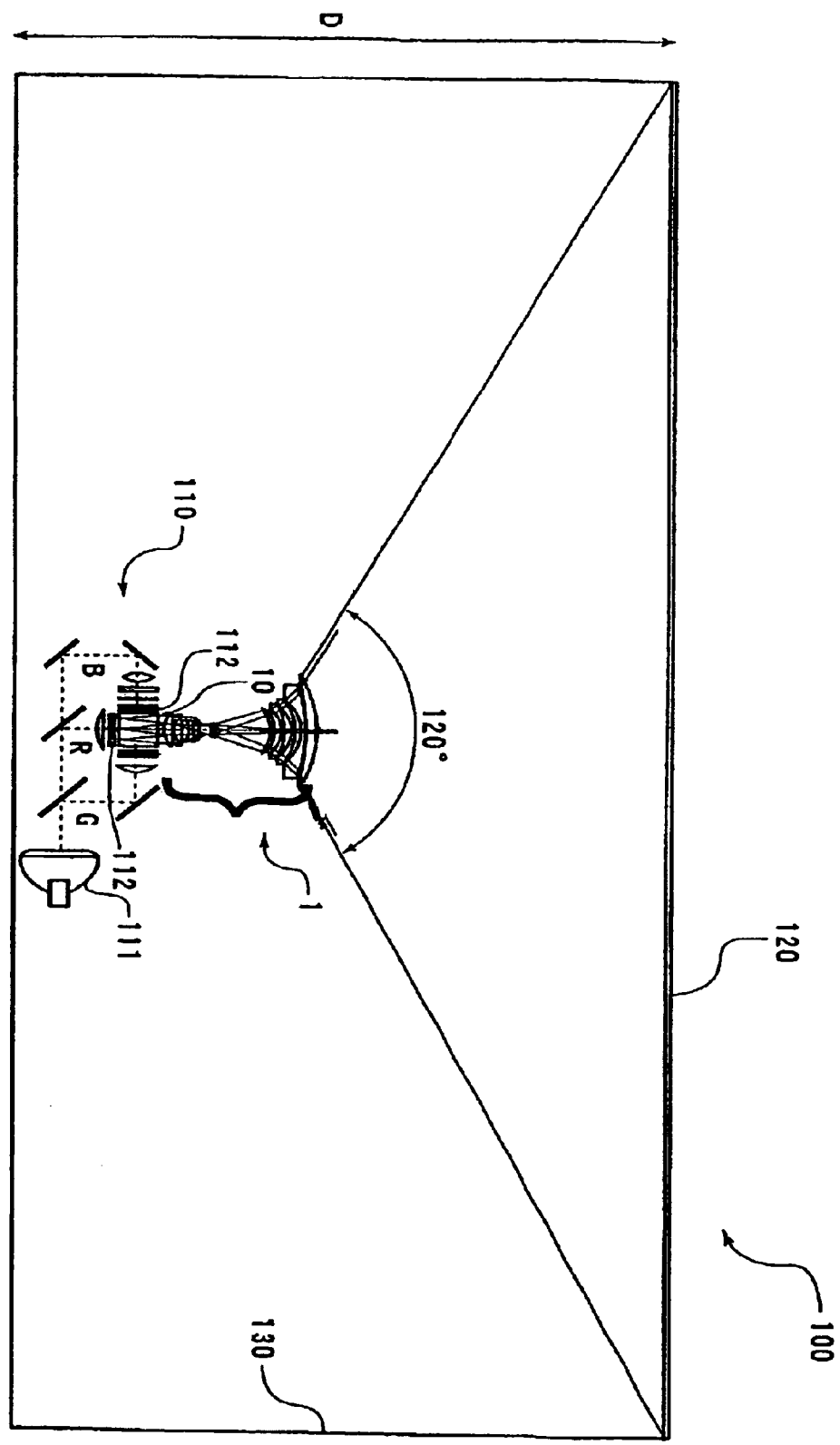
FIG. 1 is a schematic structural diagram of a rear projection image display apparatus according to an illustrative, non-limiting embodiment of the present invention.

The present invention will now be described in detail by describing illustrative, non-limiting embodiments thereof with reference to the accompanying drawings. In the drawings, the same reference characters denote the same elements. The present invention is not limited to the below-described embodiments.

Since the projection lens according to the illustrative, non-limiting embodiments of the present invention is a retrofocus type projection lens with high performance having a super large field angle and a predetermined optical performance, the projection lens according to the illustrative, non-limiting embodiments of the present invention can be used as a projection lens of a rear projection image display apparatus. Furthermore, the projection image display apparatus according to the illustrative, non-limiting embodiment of the present invention has a small depth, and thus can be used as a compact projection television, etc.

A schematic structural diagram illustrating an example of a rear projection image display apparatus is shown in FIG. 1. The projection lens according to this embodiment is suitable for use as a projection lens of the rear projection image display apparatus 100. The projection image display apparatus 100 receives a projection device 110 and a transmission screen 120 in a housing 130 in order to reduce influence of external light, and applies light toward a rear surface of the transmission screen 120 at a front surface of the housing 130 from the projection lens 1 of the projection device 110 at a back surface. An observer sees an enlarged image projected to the screen 120 from a surface side of the transmission screen 120.

The projection device 110 divides the light from a light source 111 such as a super-high-pressure mercury lamp, etc. into three colors of R, G and B by means of a dichroic mirror, allows the respective light components to pass through a display device 112 such as a liquid crystal panel, etc., synthesizing the light components passing through a display surface of the display device 112 by means of color composition means 10 such as a dichroic prism, etc., enlarges the image on the display surface by means of one projection lens 1, and then projects the enlarged image to the transmission screen 120.

Since the projection lens 1 according to the illustrative embodiment of the present invention has a field angle of 110° or more, which is larger than that of the conventional projection lens, and preferably the projection lens 1 has a super large field angle of about 120° or more, it can be suitable for use in a method of projecting light directly to the screen 120 without passing through a mirror. If the field angle is large, the depth D of the projection image display apparatus 100 can be made small. For example, as shown in FIG. 1, if the field angle is 120°, by using the projection lens 1 capable of folding a light path to lessen the total distance, the projection image display apparatus 100 having a depth of about 45 cm can be implemented with respect to a large screen of 50 inches. As a result, since the projection image display apparatus 100 according to the exemplary embodiment of the present invention employs such projection lens 1, it can be implemented to have a large screen, a small depth, and a very compact appearance.

The projection lens according to the illustrative embodiment of the present invention has a first group of lenses having a negative power and a second group of lenses having a positive power sequentially arranged from an enlargement side (the screen side) to a reduction side (the color composition means side), and has a retrofocus type configuration that is asymmetric as a whole.

Figure 2:
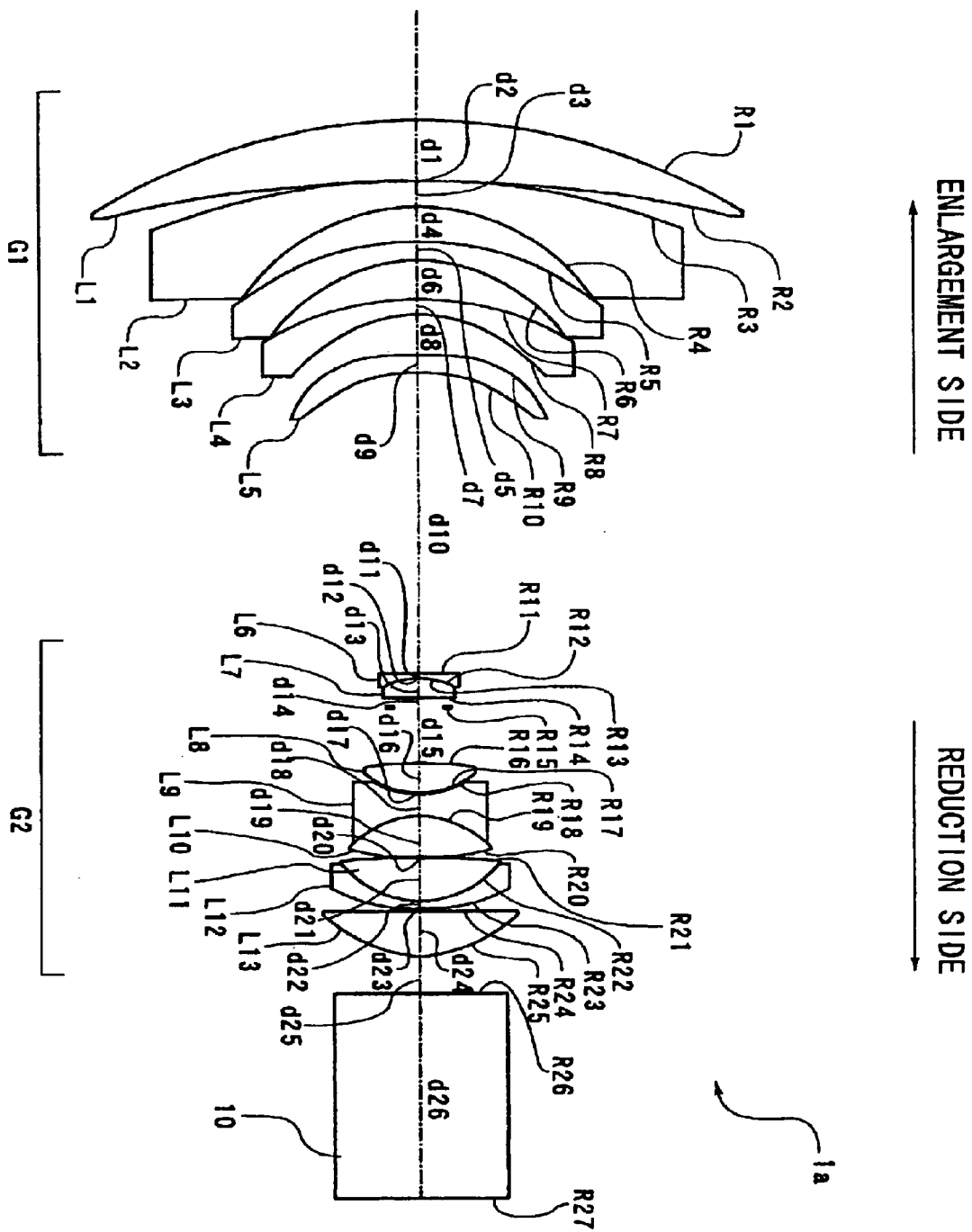
FIG. 2 is a cross-sectional view illustrating a configuration of a projection lens according to a first illustrative, non-limiting embodiment of the present invention.
Figure 3:
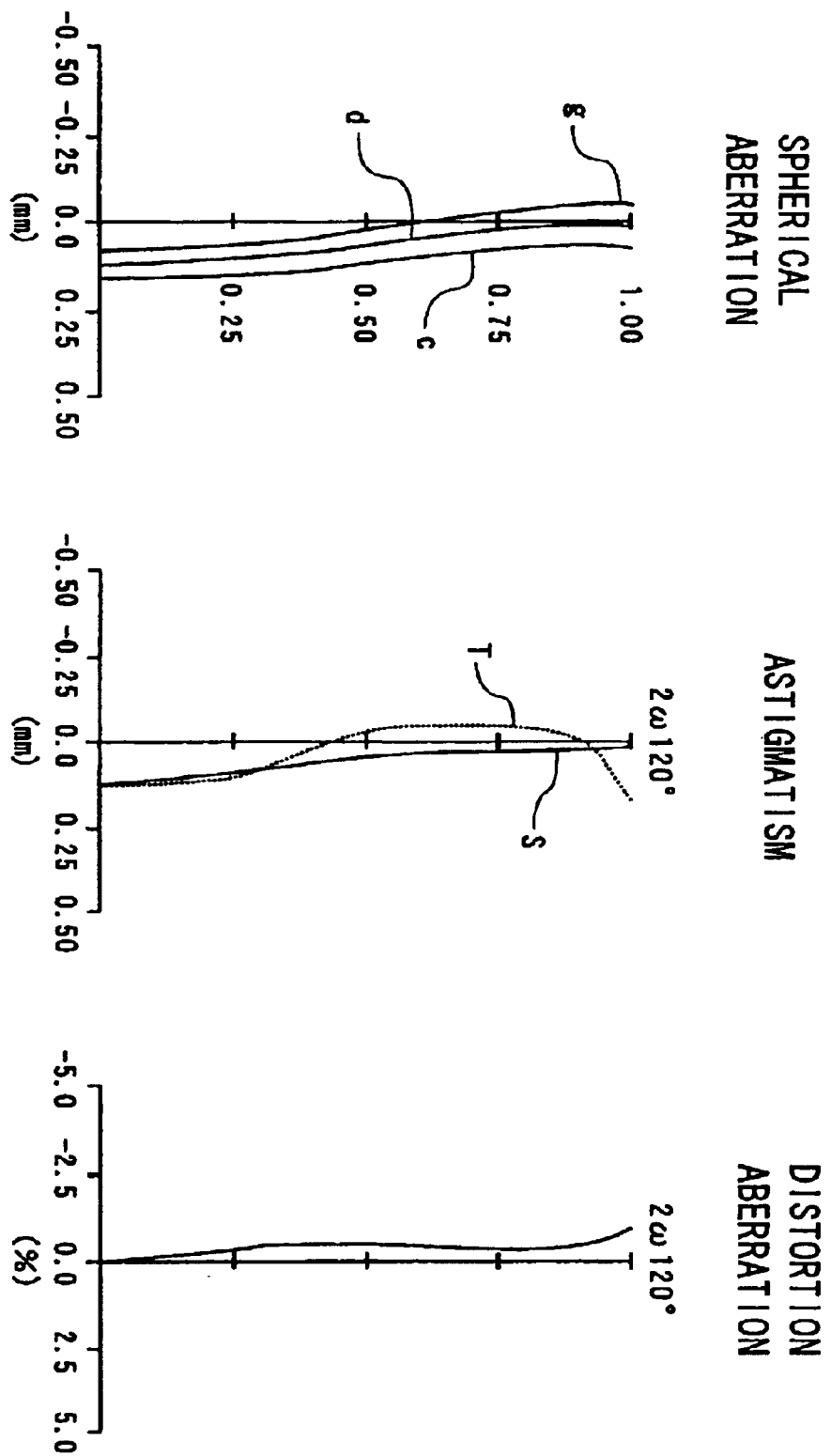
FIG. 3 is an aberration diagram of a projection lens according to the first exemplary embodiment.
Figure 4:
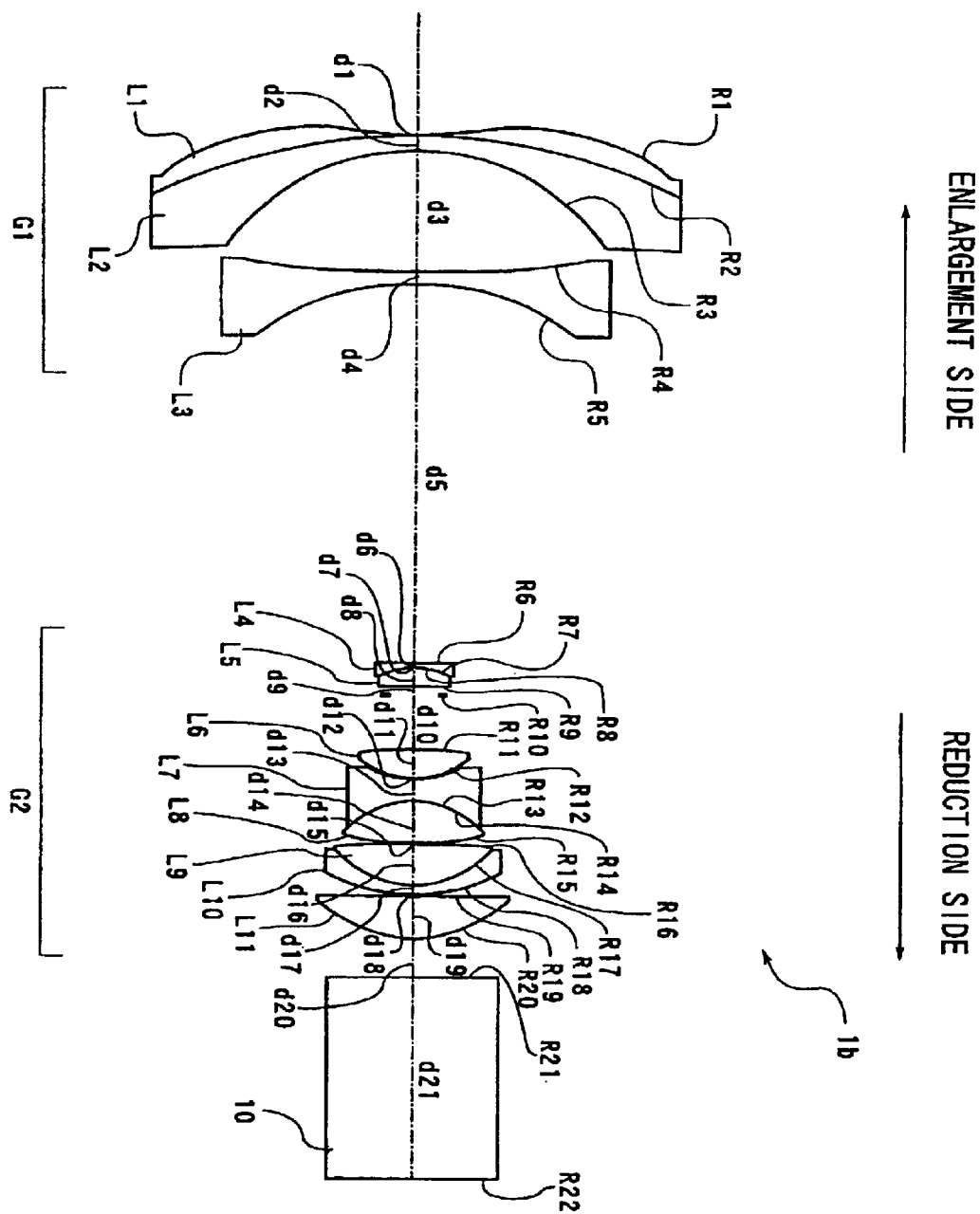
FIG. 4 is a cross-sectional view illustrating a configuration of a projection lens according to a second, illustrative, non-limiting embodiment of the present invention.
Figure 5:
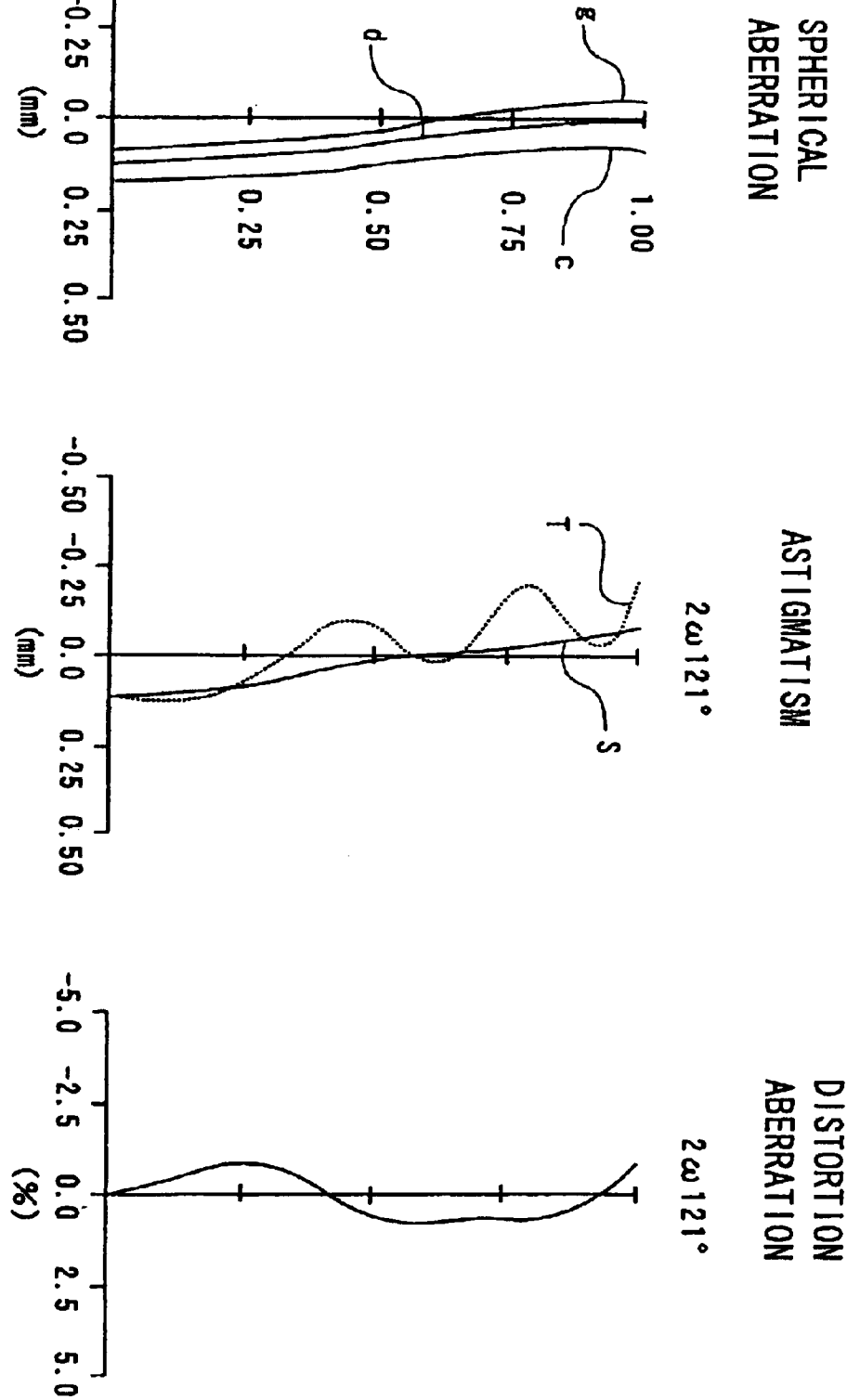
FIG. 5 is an aberration diagram of the projection lens according to the second exemplary embodiment.
Figure 6:
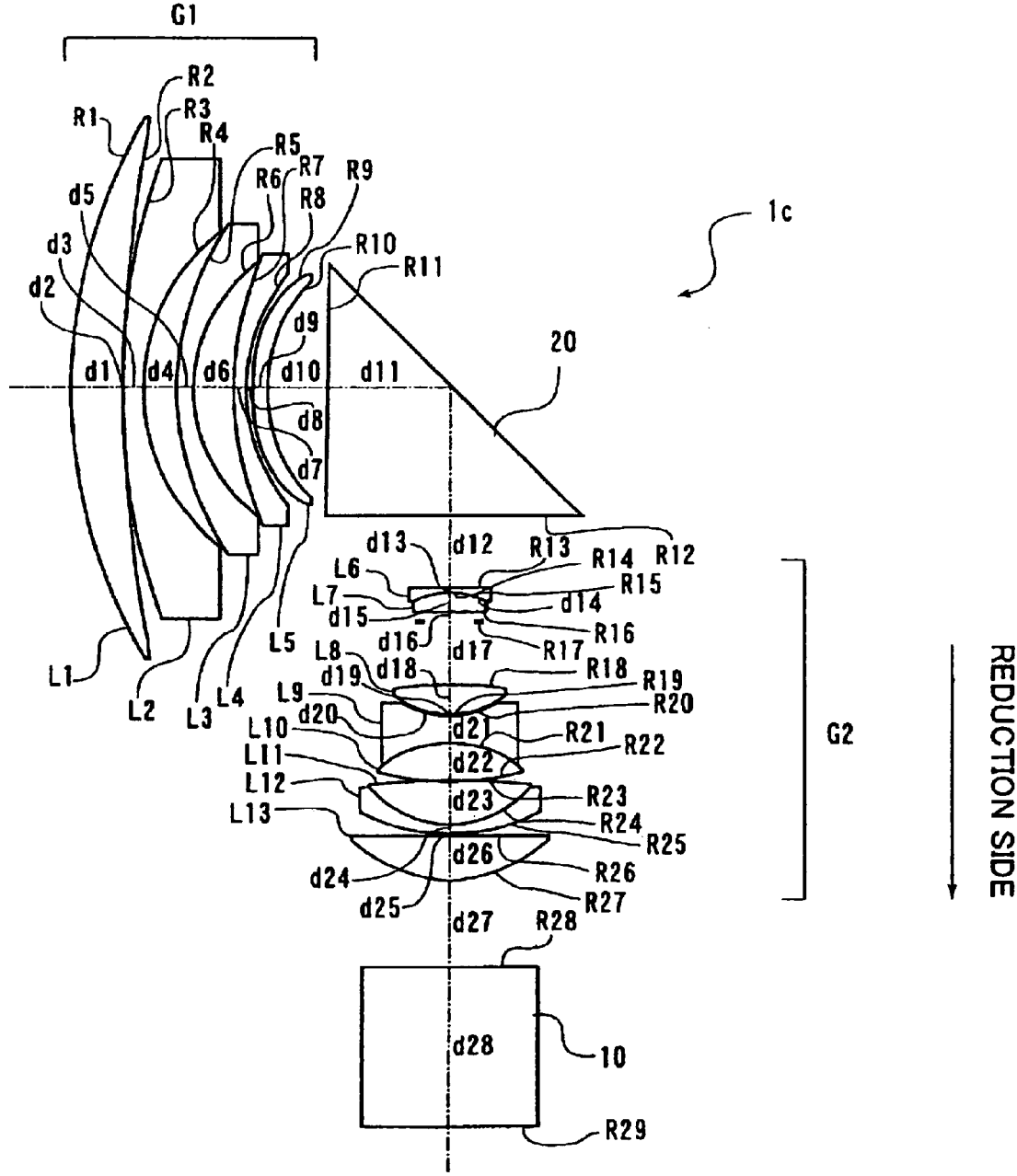
FIG. 6 is a cross-sectional view illustrating a configuration of a projection lens according to a third, illustrative, non-limiting embodiment of the present invention.
Figure 7:
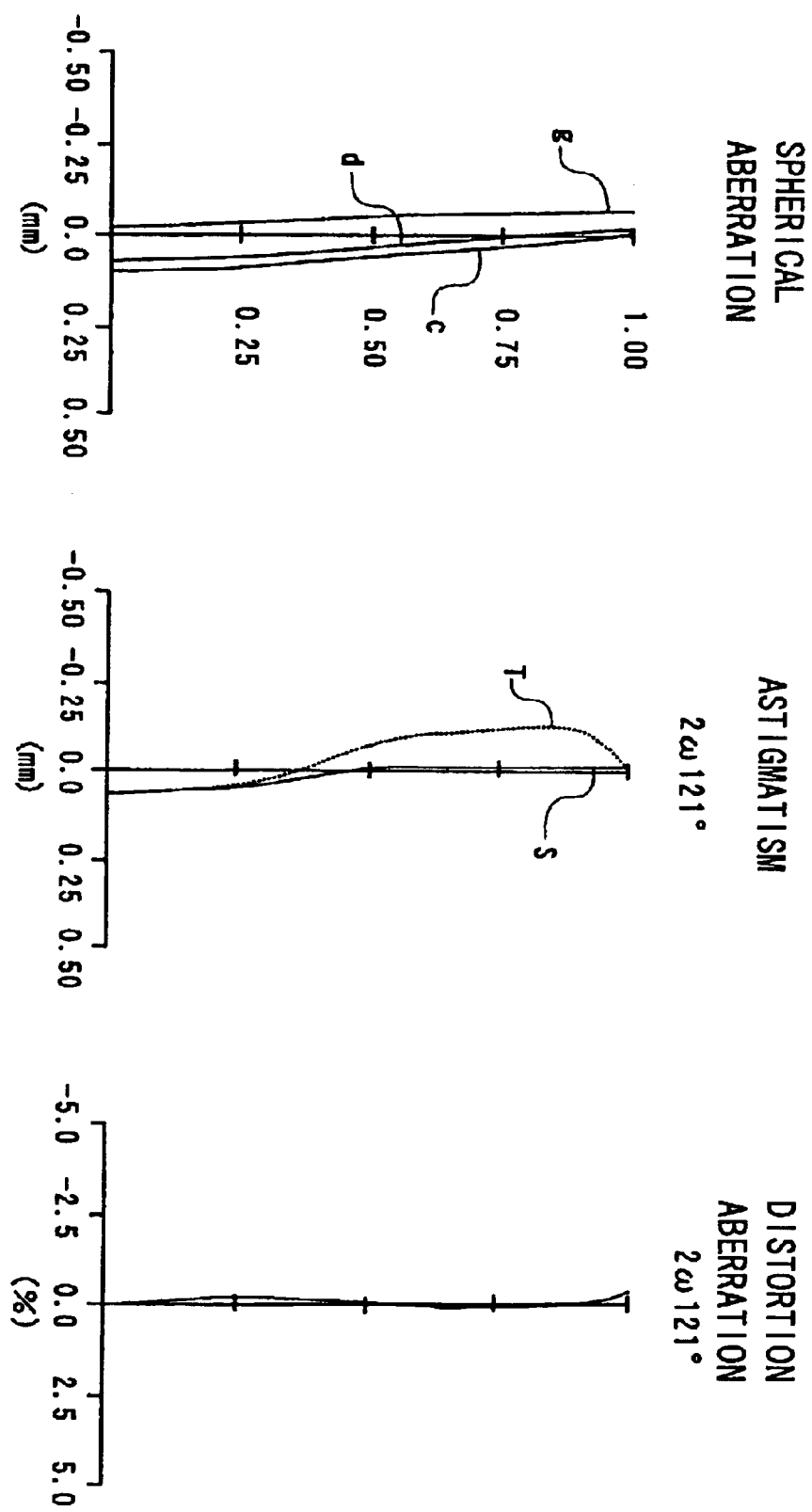
FIG. 7 is an aberration diagram of the projection lens according to the third exemplary embodiment.
Figure 8:
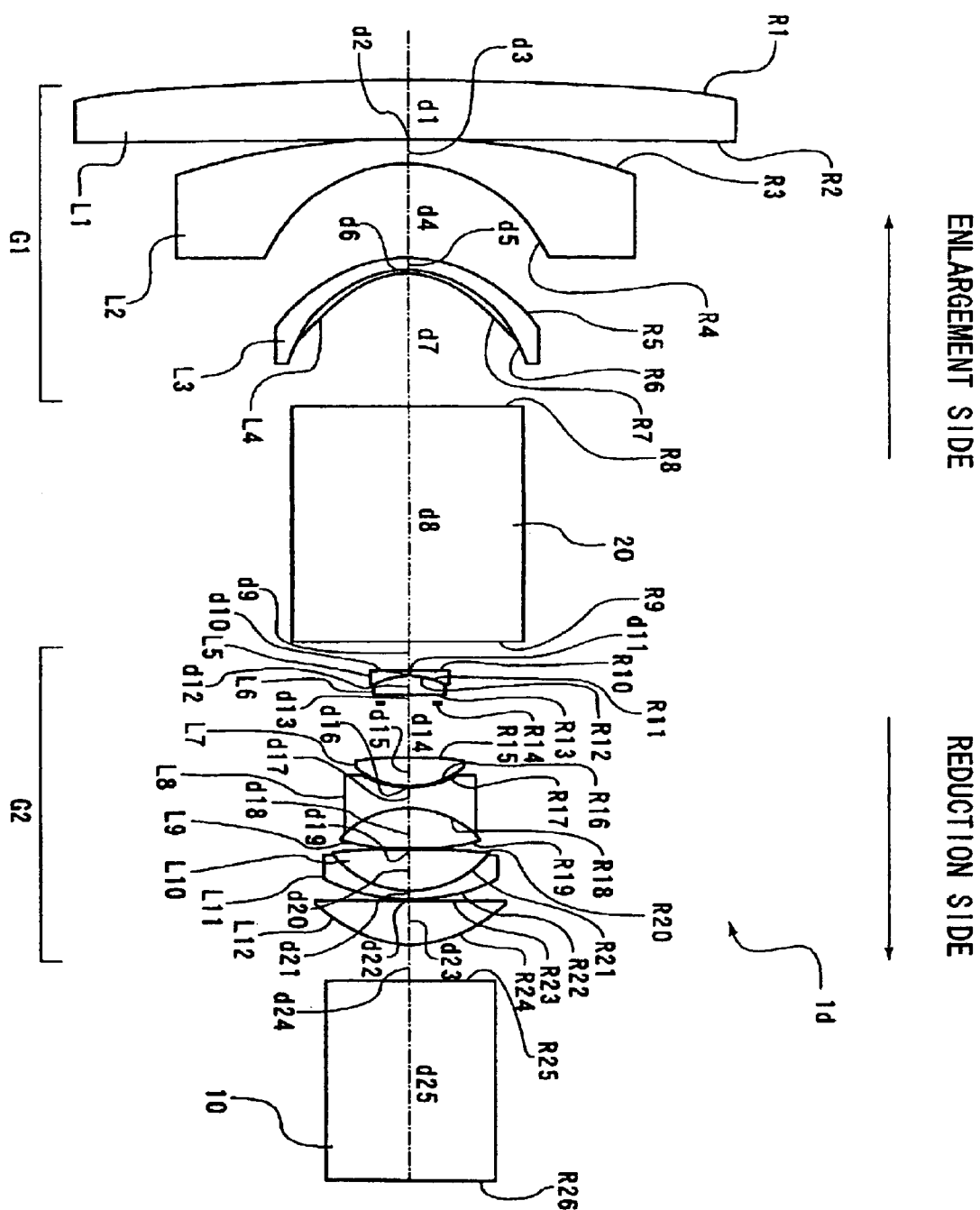
FIG. 8 is a cross-sectional view illustrating a configuration of a projection lens according to a fourth, illustrative, non-limiting embodiment of the present invention.
Figure 9:
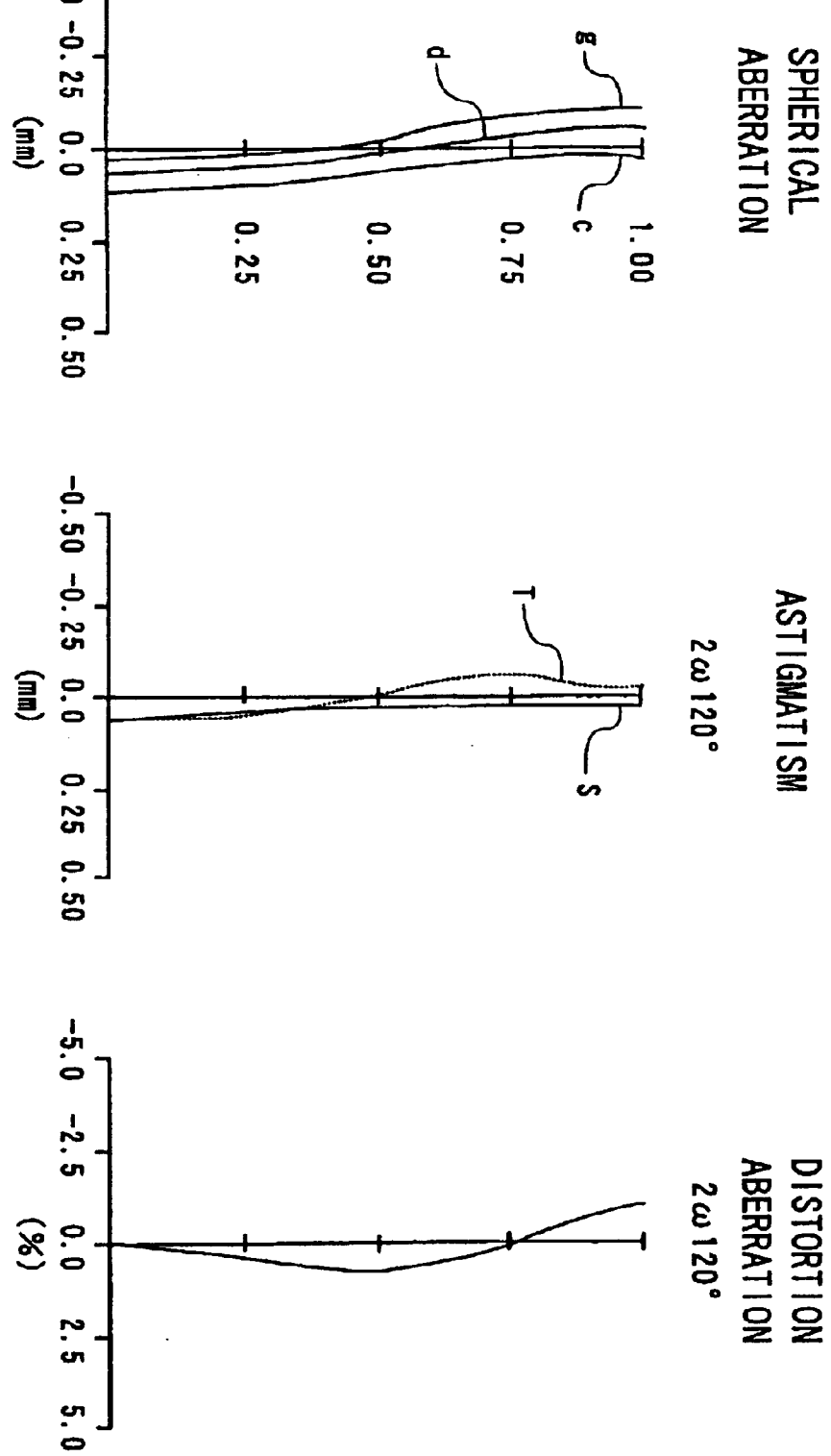
FIG. 9 is an aberration diagram of the projection lens according to the fourth exemplary embodiment of the present invention.

FIGS. 2 and 3 are a cross-sectional view and an aberration diagram of a lens according to a first, illustrative, non-limiting embodiment, respectively. FIGS. 4 and 5 are a cross-sectional view and an aberration diagram of a lens according to a second illustrative, non-limiting embodiment, respectively. FIGS. 6 and 7 are a cross-sectional view and an aberration diagram of a lens according to a third, illustrative, non-limiting embodiment, respectively. FIGS. 8 and 9 are a cross-sectional view and an aberration diagram of a lens according to a fourth, illustrative, non-limiting embodiment, respectively.

In the respective cross-sectional views of lenses, a symbol represented by Ri (i is an integer of one or more) indicates a lens surface number sequentially from the enlargement side to the reduction side, and a symbol represented by di (i is an integer of one or more) indicates central thicknesses of lenses and an air gap (mm) between the lenses sequentially from the enlargement side to the reduction side on a main optical axis. G1 denotes a first group of lenses, and G2 denotes a second group of lenses. The color composition means 10 such as a dichroic prism, etc. composes three colors passing through the display devices 112 such as three sheets of liquid crystal display devices, and is represented as a block. An image surface is substantially the same as a surface at the reduction side of the color composition means A mirror or a prism as the light path folding means 20 (shown in FIG. 6) is provided between the first group of lenses G1 and the second group of lenses G2.

In the spherical aberration diagrams of the respective aberration diagrams, illustrative, non-limiting aberrations with respect to a line c, a line d and a line g are represented, and in the astigmatism aberration diagrams, aberrations with respect to a sagittal (S) image surface and a tangential (T) image surface are represented. ω in the aberration diagrams indicates a semi field angle.

The projection lens according to the first illustrative, non-limiting embodiment of the present invention comprises a first group of lenses G1 having a negative power and a second group of lenses G2 having a positive power sequentially arranged from an enlargement side to a reduction side, and has a field angle of about 110° or more and preferably 120° or more. In order to accomplish the super-wide angle of field, it is necessary to satisfy the following conditional expressions (1) to (4):

$$25.0 < Fb, \quad (1)$$

$$F < 0.65\,H, \quad (2)$$

$$30F < |EP|, \quad (3)$$

and $$4F < T, \quad (4)$$

where Fb is an air-converted distance (mm) from a final surface at the reduction side of the lens to an image point, H is a maximum image height (mm) at the reduction side, F is a focal distance (mm) of the whole projection lens, EP is a exit pupil distance (mm), and T is an air-converted distance (mm) obtained by air-converting a gap between the first group of lenses G1 and the second group of lenses G2.

The conditional expression (1) is a conditional expression for securing a distance required for a back-focus of a projection optical system. By satisfying the conditional expression (1), the distance between the lens of the final surface (a lens surface closest to the image surface) at the reduction side and the image surface can be spaced apart at a sufficient distance from each other, and the color composition means 10 such as a color composition prism, etc. can be provided there between.

The conditional expression (2) is a conditional expression for securing the focal distance of the projection lens with respect to the maximum image height at the reduction side. The maximum image height at the reduction side is a distance from an optical axis to an outermost side of the display surface, that is, the size of the display surface. By satisfying the conditional expression (2) and thus enabling the focal distance of the projection lens to be smaller than the image height at the reduction side, the field angle of the projection lens can be increased, so that it is possible to lessen the projection distance.

The conditional expression (3) is a conditional expression for suppressing the influence of an angle dependency of the color composition means as much as possible. A deposited film provided in a dichroic prism has an angle dependency on an incident angle of a ray. By satisfying the conditional expression (3), a principal ray gets substantially perpendicular to the display surface, so that it is possible to prevent the color heterogeneity on the screen. The exit pupil distance EP may be infinite.

The conditional expression (4) is a conditional expression for securing the gap between the first group of lenses G1 and the second group of lenses G2. By satisfying the conditional expression (4), the gap between the first group of lenses G1 and the second group of lenses G2 can be increased, and the powers of the first group of lenses G1 and the second group of lenses G2 can be prevented from increasing excessively, so that it is possible to improve an imaging performance of the lens, and by providing the light path folding means such as a mirror or a prism in the gap to fold the light path, the projection device can be downsized. The air-converted distance T of the gap between the first group of lenses G1 and the second group of lenses G2 is not limited, and may be increased up to an extent not hindering the reduction in size of an apparatus.

By satisfying the conditional expressions (1) through (4), it is possible to accomplish a large field angel of about 110° or more, and it is also possible to effectively correct various aberrations.

In order to accomplish a large field angel of about 110° or more, it is preferable that the following conditional expressions (5) and (6) should be satisfied:

$$-3.5 < F1/F < -1.5, \quad (5)$$

and $$3.0 < F2/F < 5.5, \quad (6)$$

where F1 is a focal distance (mm) of the first group of lenses G1, and F2 is a focal distance (mm) of the second group of lenses G2.

The conditional expression (5) is a conditional expression for prescribing a power distribution of the first group of lenses G1 and securing the correction of aberrations. When the upper limit of the conditional expression (5) is exceeded, the power of the first group of lenses G1 is excessively increased, so that it may be difficult to correct a distortion aberration, a coma aberration, etc. On the other hand, when the lower limit of the conditional expression (5) is exceeded, the gap between the first group of lenses G1 and the second group of lenses G2 is increased, so that a lens diameter of the first group of lenses G1 may be excessively enlarged.

The conditional expression (6) is a conditional expression for prescribing a power distribution of the second group of lenses G2 and securing the correction of aberrations. When the upper limit of the conditional expression (6) is exceeded, the power of the second group of lenses G2 is decreased, so that it may be difficult to secure a lens back. On the other hand, when the lower limit of the conditional expression (6) is exceeded, the power of the second group of lenses G2 is increased excessively, so that it may be difficult to correct the aberrations such as a chromatic aberration of a magnification, a field curvature, etc.

It is preferable that the first group of lenses G1 includes at least one aspheric lens, and when a shape difference between an approximate spherical surface and an aspheric surface is referred to as an aspheric amount, the aspheric amount of the aspheric lens is 0.5 mm or more.

By using the aspheric lens having a large aspheric amount in the first group of lenses G1, various aberrations such as astigmatism, field curvature, distortion, etc. can be effectively corrected, thereby implementing a high-performance projection lens. It is sufficient if the aspheric surface is provided at a first surface of the enlargement side, or at a final surface or at a surface one prior to the final surface on the reduction side in the first group of lenses G1.

It is also preferable that a hybrid lens obtained by bonding a resin layer to a surface of a raw material for a glass lens is used as the aspheric lens having an aspheric amount of 0.5 mm or more.

In the hybrid lens, the resin layer can be formed to have a maximum thickness of 1 through 10 mm, and the aspheric amount of 0.5 mm or more can be easily accomplished. By employing the hybrid lens having a large aspheric amount, the number of lenses required for the first group of lenses G1 can be reduced, so that it is possible to reduce the total length of the projection lens and also to lower the cost of production.

The hybrid lens can be manufactured, for example, by arranging a raw material for a glass lens and a glass die to face each other, adhering an adhesive tape to side surfaces thereof to seal hermetically an air gap between the raw material for the glass lens and the glass die and to assemble a hybrid lens shaping die, injecting an ultraviolet cure resin composition into the air gap of the hybrid lens shaping die, applying an ultraviolet ray to the ultraviolet cure resin composition from both sides of the raw material for the glass lens and the glass die to cure the ultraviolet cure resin composition and to form a resin layer on the cured raw material for the glass lens, and then removing the adhesive tape to separate the glass die from the resin layer.

It is also preferable that the second group of lenses G2 include at least one aspheric lens and at least one cemented lens. By constructing the second group of lenses G2 in this way, it is possible to effectively correct the chromatic aberration.

It is also preferable that the cemented lens included in the second group of lenses G2 comprise at least one lens having a positive power and one lens having a negative power, and that the second group of lenses G2 satisfies the following conditional expressions (7) and (8):

$$0.15 < |Np - Nn|, \quad (7)$$

and $$30 < |Vp - Vn|, \quad (8)$$

where Np is a refractive index of the lens having a positive power, Nn is a refractive index of the lens having a negative power, Vp is an Abbe number of the lens having a positive power, and Vn is an Abbe number of the lens having a negative power.

By employing the cemented lens satisfying the conditional expressions (7) and (8), it is possible to effectively correct the chromatic aberration.

It is also preferable that light path folding means such as a mirror or a prism for folding a light path is provided between the first group of lenses G1 and the second group of lenses G2 (e.g., see FIG. 6, folding means 20). By folding the light path in the projection lens, the projection device can be prevented from being protruded toward a backside of the screen, so that it is possible to downsize the whole apparatus.

(First Embodiment)

Next, the design data of the first, illustrative, non-limiting embodiment is described in detail with reference to Table 1. In Table 1, curvature radiuses R (mm) of the respective lens surfaces Ri, central thicknesses of the respective lenses and air gaps between the respective lenses di (mm), and a refractive index Nd and an Abbe number Vd of an i-th optical material sequentially from the enlargement side to the reduction side with to a line d in the cross-sectional view of the lenses, shown in FIG. 2, are listed. Aspheric coefficients k, A4, A6, A8 and A10 in the following aspheric equation are listed at a lower end of Table 1.

$$z = \frac{cr^2}{1 + \sqrt{1 - (1+k)c^2 r^2}} + A_4 r^4 + A_6 r^6 + A_8 r^8 + A_{10} r^{10} \quad \text{[Equation 1]}$$

Here, Z is a coordinate value of a curved surface, r is a distance from an optical axis in a direction perpendicular to the optical axis, c is a curvature at a lens vertex, and k, A4, A6, A8 and A10 are the aspheric coefficients, respectively.

The ninth surface of the fifth lens L5 facing the enlargement side, the fifth lens being the final lens constituting the first group of lenses G1 of the projection lens 1a according to the first embodiment, is an aspheric surface having an aspheric amount of 0.5 mm or more. The twenty-fifth surface that is the final surface of the thirteenth lens L13 facing the reduction side, the thirteenth lens being the final lens of the second group of lenses G2, is an aspheric surface. An iris R15 is provided between the second lens L7 and the third lens L8 of the second group of lenses G2. A pair of the ninth lens L9 and the next tenth lens L10 and a pair of the eleventh lens L11 and the next twelfth lens L12 constituting the second group of lenses G2 form cemented lenses, respectively.

Design specification values are shown in Table 5. The field angle is 120°, and the values satisfy the conditional expressions (1) to (8). The projection lens is a lens having a super-large field angle of about 120°, and it can be seen from the aberration of FIG. 3 that the projection lens has a predetermined optical performance.

(Second Embodiment)

The design data of the second embodiment is shown in Table 2. In Table 2, curvature radiuses R (mm) of the respective lens surfaces Ri, central thicknesses of the respective lenses and air gaps between the respective lenses di (mm), and a refractive index ND and an Abbe number Vd of an i-th optical material sequentially from the enlargement side to the reduction side with respect to a line d in the cross-sectional view of the lenses shown in FIG. 4 are listed. Aspheric coefficients k, $A_4$, $A_6$, $A_8$ and $A_{10}$ in the aforementioned aspheric equation are listed at a lower end of Table 2.

TABLE 1

| Surface No. | Radius of curvature R | Distance d | Nd | Vd | |
|---|---|---|---|---|---|
| 1 | 119.56 | 11.0 | 1.60311 | 60.7 | L1 |
| 2 | 267.95 | 0.1 | | | |
| 3 | 151.25 | 4.5 | 1.77250 | 49.6 | L2 |
| 4 | 40.73 | 6.4 | | | |
| 5 | 57.93 | 3.2 | 1.77250 | 49.6 | L3 |
| 6 | 34.05 | 7.1 | | | |
| 7 | 60.04 | 2.8 | 1.77250 | 49.6 | L4 |
| 8 | 29.71 | 7.1 | | | |
| 9 | 78.59 | 3.5 | 1.49180 | 57.5 | L5 |
| 10 | 32.28 | 55.4 | | | Aspheric lens |
| 11 | 70.03 | 1.0 | 1.80400 | 46.6 | L6 |
| 12 | 12.13 | 0.1 | | | |
| 13 | 12.64 | 3.5 | 1.76182 | 26.6 | L7 |
| 14 | −235.77 | 1.6 | | | |
| 15 | ( | 10.7 | | | Iris |
| 16 | 117.04 | 5.0 | 1.49700 | 81.6 | L8 |
| 17 | −16.625 | 0.1 | | | |
| 18 | −21.01 | 4.4 | 1.72047 | 34.7 | L9, L10 |
| 19 | 17.892 | 7.5 | 1.49700 | 81.6 | Cemented lens |
| 20 | −52.23 | 0.1 | | | |
| 21 | 154.69 | 7.9 | 1.49700 | 81.6 | L11, L12 |
| 22 | −19.785 | 1.7 | 1.72047 | 34.7 | Cemented lens |
| 23 | −36.25 | 0.1 | | | |
| 24 | 389.78 | 8.5 | 1.48749 | 70.1 | L13 |
| 25 | −21.14 | 6.6 | | | Aspheric lens |
| 26 | ( | 37.0 | 1.51633 | 64.1 | Prism |
| 27 | ( | | | | |

Aspherical Data

| Surface No. | K | A4 | $A_6$ | $A_8$ | $A_{10}$ |
|---|---|---|---|---|---|
| 9 | 7.4685 | 2.0797E−05 | −1.1810E−08 | 1.2767E−11 | 1.1840E−14 |
| 25 | −1.6613 | −9.2184E−07 | −1.5153E−08 | 3.6094E−12 | −6.4012E−14 |

TABLE 2

| Surface No. | Radius of curvature R | Distance d | Nd | Vd | |
|---|---|---|---|---|---|
| 1 | −80.86 | 0.5 | 1.54860 | 44.3 | L1, L2 |
| 2 | 120 | 2.5 | 1.77250 | 49.6 | Cemented lens |
| 3 | 44.996 | 22.1 | | | |
| 4 | −279.47 | 3.2 | 1.77250 | 49.6 | L3 |
| 5 | 52.51 | 53.6 | | | |
| 6 | 70.03 | 1.0 | 1.80400 | 46.6 | L4 |
| 7 | 12.13 | 0.1 | | | |
| 8 | 12.64 | 3.5 | 1.76182 | 26.6 | L5 |
| 9 | −235.77 | 1.6 | | | |
| 10 | ∞ | 10.7 | | | Iris |
| 11 | 117.04 | 5.0 | 1.49700 | 81.6 | L6 |
| 12 | −16.625 | 0.1 | | | |
| 13 | −21.01 | 4.4 | 1.72047 | 34.7 | L7, L8 |
| 14 | 17.892 | 7.5 | 1.49700 | 81.6 | Cemented lens |
| 15 | −52.23 | 0.1 | | | |
| 16 | 154.69 | 7.9 | 1.49700 | 81.6 | L9, L10 |
| 17 | −19.785 | 1.7 | 1.72047 | 34.7 | Cemented lens |
| 18 | −36.25 | 0.1 | | | |
| 19 | 389.78 | 8.5 | 1.48749 | 70.1 | L11 |
| 20 | −21.14 | 6.6 | | | Aspheric lens |
| 21 | ∞ | 37.0 | 1.51633 | 64.1 | Prism |
| 22 | ∞ | | | | |

Aspherical Data

| Surface No. | K | $A_4$ | $A_6$ | $A_8$ | $A_{10}$ |
|---|---|---|---|---|---|
| 1 | −13.2299 | 9.0658E−06 | −7.8959E−09 | 4.6057E−12 | −1.4352E−15 |
| 20 | −1.6613 | −9.2184E−07 | −1.5153E−08 | 3.6094E−12 | −6.4012E−14 |

The first lens L1 and the second lens L2 in the first group of lenses G1 of the projection lens 1b according to the second embodiment constitute a hybrid lens, and the first surface of the first lens L1 facing the enlargement side is an aspheric surface having an aspheric amount of 0.5 mm or more. The resin layer of the hybrid lens has a central thickness of about 0.5 mm, and the maximum thickness of the resin layer is about 5 mm. The twentieth surface that is the final surface of the eleventh lens L11 facing the reduction side, the eleventh lens being the final lens of the second group of lenses G2, is an aspheric surface. An iris R10 is provided between the second lens L5 and the third lens L6 constituting the second group of lenses G2. A pair of the seventh lens L7 and the next eight lens L8 and a pair of the ninth lens L9 and the next tenth lens L10 in the second group of lenses G2 form cemented lenses, respectively.

Design specification values are shown in Table 5. The field angle is about 121°, and the values satisfy the conditional expressions (1) to (8). The projection lens is a lens having a super-large field angle of about 121°, and it can be seen from the aberration diagram of FIG. 5 that the projection lens has a predetermined optical performance. Since the hybrid lens has a very large aspheric surface, the number of lenses in the first group of lenses G1 can be decreased by three to two lens from five lens, as shown in the first embodiment. As a result, the projection lens 1b according to the second embodiment accomplishes the reduction in size of the apparatus and the decrease in cost of production.

(Third Embodiment)

The design data of the third embodiment is shown in Table 3. In Table 3, curvature radiuses R (mm) of the respective lens surfaces Ri, central thicknesses of the respective lenses and air gaps between the respective lenses di (mm), and a refractive index Nd and an Abbe number Vd of an i-th optical material sequentially from the enlargement side to the reduction side with respect to a line d in the cross-sectional view of the lenses shown in FIG. 6 are listed. Aspheric coefficients k, $A_4$, $A_6$, $A_8$ and $A_{10}$ in the aforementioned aspheric equation are listed at a lower end of Table 3.

TABLE 3

| Surface No. | Radius of curvature R | Distance d | Nd | Vd | |
|---|---|---|---|---|---|
| 1 | 90.83 | 8.1 | 1.60311 | 60.7 | L1 |
| 2 | 206.15 | 0.1 | | | |

TABLE 3-continued

| Surface No. | Radius of curvature R | Distance d | Nd | Vd | |
|---|---|---|---|---|---|
| 3 | 116.43 | 3.5 | 1.77250 | 49.6 | L2 |
| 4 | 32.52 | 5.6 | | | |
| 5 | 50.10 | 2.5 | 1.77250 | 49.6 | L3 |
| 6 | 26.59 | 6.6 | | | |
| 7 | 56.94 | 2.1 | 1.77250 | 49.6 | L4 |
| 8 | 30.55 | 0.8 | | | |
| 9 | 47.86 | 2.6 | 1.49180 | 57.5 | L5 |
| 10 | 25.78 | 10.0 | | | Aspheric lens |
| 11 | ∞ | 42.0 | 1.62004 | 36.3 | Prism |
| 12 | ∞ | 11.5 | | | |
| 13 | 81.17 | 1.5 | 1.74320 | 49.3 | L6 |
| 14 | 12.873 | 0.1 | | | |
| 15 | 13.578 | 3.5 | 1.76182 | 26.6 | L7 |
| 16 | −148.13 | 1.2 | | | |
| 17 | ∞ | 10.3 | | | Iris |
| 18 | 149.84 | 4.7 | 1.60311 | 60.7 | L8 |
| 19 | −15.09 | 0.1 | | | |
| 20 | −16.70 | 4.5 | 1.72047 | 34.7 | L9, L10 |
| 21 | 16.70 | 6.2 | 1.49700 | 81.6 | Cemented lens |
| 22 | −84.06 | 0.1 | | | |
| 23 | 116.93 | 7.2 | 1.49700 | 81.6 | L11, L12 |
| 24 | −18.388 | 1.4 | 1.83400 | 37.2 | Cemented lens |
| 25 | −28.67 | 0.1 | | | |
| 26 | ∞ | 7.7 | 1.48749 | 70.1 | L13 |
| 27 | −21.224 | 13.4 | | | Aspheric lens |
| 28 | ∞ | 26.6 | 1.51633 | 64.1 | Prism |
| 29 | ∞ | | | | |

Aspherical Data

| Surface No. | K | $A_4$ | $A_6$ | $A_8$ | $A_{10}$ |
|---|---|---|---|---|---|
| 9 | 1.4479 | 3.1475E−05 | −1.1439E−08 | 1.4321E−11 | 9.4917E−14 |
| 27 | −1.6613 | −9.2184E−07 | −1.5153E−08 | 3.6094E−12 | −6.4012E−14 |

In the projection lens 1c, a prism 20 for folding the light path is provided between the first group of lenses G1 and the second group of lenses G2 to fold the light path by 90°, so that it is possible to further reduce the size of the projection image display apparatus. The ninth surface of the fifth lens L5 facing the enlargement side, the fifth lens being the final lens in the first group of lenses G1 is an aspheric surface having an aspheric amount of 0.5 mm or more. The twenty-seventh surface that is the final surface of the thirteenth lens L13 facing the reduction side, the thirteenth lens being the final lens of the second group of lenses G2, is an aspheric surface. An iris R17 is provided between the second lens L7 and the third lens L8 in the second group of lenses G2. A pair of the ninths L9 and the next tenth lens L10 and a pair of the eleventh lens L11 and the next twelfth lens L12 in the second group of lenses G2 form cemented lenses, respectively.

Design specification values are shown in Table 5. The field angle is about 121°, and the values satisfy the conditional expressions (1) to (8). The projection lens is a lens having a super-large field angle of about 121°, and it can be accepted from the aberration diagram of FIG. 7 that the projection lens has a predetermined optical performance.

(Fourth Embodiment)

The design data of the fourth embodiment is shown in Table 4. In Table 4, curvature radiuses R (mm) of the respective lens surfaces Ri, central thicknesses of the respective lenses and air gaps between the respective lenses di (mm), and a refractive index Nd and an Abbe number Vd of an i-th optical material sequentially from the enlargement side to the reduction side with respect to a line d in the cross-sectional view of the lenses shown in FIG. 8 are listed. Aspheric coefficients k, $A_4$, $A_6$, $A_8$ and $A_{10}$ in the aforementioned aspheric equation are listed at a lower end of Table 4.

TABLE 4

| Surface No. | Radius of curvature R | Distance d | Nd | Vd | |
|---|---|---|---|---|---|
| 1 | 531.34 | 11.0 | 1.60311 | 60.7 | L1 |
| 2 | 2838.87 | 0.1 | | | |
| 3 | 149.577 | 4.5 | 1.77250 | 49.6 | L2 |
| 4 | 28.59 | 17.9 | | | |
| 5 | 29.671 | 2.3 | 1.77250 | 49.6 | L3, L4 |
| 6 | 22.91 | 0.5 | 1.54860 | 44.3 | Cemented lens |
| 7 | 14.36 | 25.0 | | | |
| 8 | ∞ | 45.0 | 1.62004 | 36.3 | Prism |
| 9 | ∞ | 5.574 | | | |
| 10 | 70.03 | 1.0 | 1.74320 | 49.3 | L5 |
| 11 | 12.13 | 0.1 | | | |
| 12 | 12.64 | 3.5 | 1.76182 | 26.6 | L6 |
| 13 | −235.77 | 1.627 | | | |
| 14 | ∞ | 10.736 | | | Iris |
| 15 | 117.04 | 5.0 | 1.49700 | 81.6 | L7 |
| 16 | −16.625 | 0.1 | | | |
| 17 | −21.01 | 4.35 | 1.72047 | 34.7 | L8, L9 |
| 18 | 17.89 | 7.5 | 1.49700 | 81.6 | Cemented lens |
| 19 | −52.23 | 0.1 | | | |
| 20 | 154.69 | 7.85 | 1.49700 | 81.6 | L10, L11 |
| 21 | −19.785 | 1.7 | 1.72047 | 34.7 | Cemented lens |
| 22 | −36.25 | 0.1 | | | |
| 23 | 389.78 | 8.5 | 1.48749 | 70.1 | L12 |
| 24 | −21.14 | 6.6 | | | Aspheric lens |
| 25 | ∞ | 37.0 | 1.51633 | 64.1 | Prism |
| 26 | ∞ | | | | |

Aspherical Data

| Surface No. | K | $A_4$ | $A_6$ | $A_8$ | $A_{10}$ |
|---|---|---|---|---|---|
| 7 | −1.118836 | −4.6878E−06 | 6.5700E−10 | −1.7687E−11 | 2.1981E−14 |
| 24 | −1.6613 | −9.2184E−07 | −1.5153E−08 | 3.6094E−12 | −6.4012E−14 |

In the projection lens 1d, the gap between the first group of lenses G1 and the second group of lenses G2 can be increased, and the prism 20 is provided in the gap. The prism 20 shown in FIG. 8 is not a prism for folding the light path, but is optically the same as the prism for folding the light path. Accordingly, it is possible to contribute to the reduction in size of the projection lens 1d or the projection image display apparatus.

The third lens L3 and the fourth lens L4 in the first group of lenses G1 form a laminated hybrid lens, and the seventh surface that is the resin layer of the final surface of the first group of lenses G1 is an aspheric surface having an aspheric amount of 0.5 mm or more. The twenty-fourth surface that is the final surface of the twelfth lens L12 facing the reduction side, the twelfth lens being the final lens of the second group of lenses G2, is an aspheric surface. An iris R14 is provided between the second lens L6 and the third lens L7 constituting the second group of lenses G2. A pair of the eighth lens L8 and the next ninth lens L9 and a pair of the tenth lens L10 and the next eleventh lens L11 in the second group of lenses G2 form cemented lenses, respectively.

Design specification values are shown in Table 5. The field angle is about 120°, and the values satisfy the conditional expressions (1) to (8). The projection lens is a lens having a super-large field angle of about 120°, and it can be seen from the aberration diagram of FIG. 9 that the projection lens has a predetermined optical performance. Since the hybrid lens has a large aspheric surface, the number of lenses in the first group of lenses G1 can be decreased by two to three from the five in the first embodiment. As a result, the projection lens 1d according to the fourth embodiment accomplishes the reduction in size and lower production cost.

TABLE 5

| Design specification | Symbol | Embodiment 1 | Embodiment 2 | Embodiment 3 | Embodiment 4 |
|---|---|---|---|---|---|
| Angle of field | 2ω | 120° | 121° | 121° | 120° |
| Focal distance | F1 | 6.82 | 6.82 | 6.80 | 6.82 |
| F number | Fno | 3.0 | 3.0 | 3.0 | 3.0 |
| Lens back | Fb | 31.0 | 31.0 | 30.9 | 31.0 |
| Maximum image height | H | 11.5 | 11.5 | 11.5 | 11.5 |
| Exit pupil distance | EP | 257 | 257 | 2266 | 257 |
| Distance between first group and second group | T | 55.4 | 53.6 | 47.4 | 55.4 |
| Focal distance of first group | F1 | −20.26 | −20.28 | −19.23 | −20.26 |
| Focal distance of second group | F2 | 31.2 | 31.2 | 31.5 | 31.2 |

The above and other features of the invention including various and novel details of the process and construction of the parts has been particularly described with reference to the accompanying drawings and pointed out in the claims. It will be understood that the particular process and construction of parts embodying the invention is shown by way of illustration only and not as a limitation of the invention. The principles and features of this invention may be employed in varied and numerous embodiments without departing from the scope of the invention.

What is claimed is:

1. A projection lens for enlarging an image on a display surface and projecting the enlarged image onto a screen, the projection lens comprising:

a first group of lenses having a negative power; and a second group of lenses having a positive power, wherein the first and the second groups are sequentially arranged from an enlargement side to a reduction side, and wherein the projection lens has a field angle of about 110° or more and the projection lens satisfies the following conditional expressions (1) to (4):

$$25.0 < Fb, \tag{1}$$

$$F < 0.65\ H, \tag{2}$$

$$30F < |EP|, \tag{3}$$

and $$4F < T, \tag{4}$$

where Fb is an air-converted distance from a final surface at the reduction side of the lens to an image point, H is a maximum image height at the reduction side, F is a focal distance of the whole projection lens, EP is a exit pupil distance, and T is an air-converted distance obtained by air-converting a gap between the first group of lenses and the second group of lenses.

2. The projection lens according to claim 1, wherein the projection lens further satisfies the following conditional expressions (5) and (6):

$$-3.5 < F_1/F < -1.5, \tag{5}$$

and $$3.0 < F_2/F < 5.5, \tag{6}$$

where $F_1$ is a focal distance of the first group of lenses, and $F_2$ is a focal distance of the second group of lenses.

3. The projection lens according to claim 1, wherein the first group of lenses comprises at least one aspheric lens, and when a shape difference between an approximate spherical surface and an aspheric surface is referred to as an aspheric amount, the aspheric amount of the aspheric lens is about 0.5 mm or more.

4. The projection lens according to claim 3, wherein the aspheric lens is a hybrid lens obtained by bonding a resin layer to a surface of a raw material for a glass lens.

5. The projection lens according to claim 1, wherein the second group of lenses comprises at least one aspheric lens and at least one cemented lens.

6. The projection lens according to claim 5, wherein the cemented lens comprises at least one lens having a positive power and one lens having a negative power, and wherein the cemented lens satisfies the following conditional expressions (7) and (8):

$$0.15 < |Np-Nn|, \tag{7}$$

and $$30 < |Vp-Vn|, \tag{8}$$

where Np is a refractive index of the lens having a positive power, Nn is a refractive index of the lens having a negative power, Vp is an Abbe number of the lens having a positive power, and Vn is an Abbe number of the lens having a negative power.

7. The projection lens according to claim 1, wherein light path folding means for folding a light path is provided between the first group of lenses and the second group of lenses.

8. The projection lens according to claim 1, wherein color composition means is provided between the final surface at the reduction side of the second group of lenses and the image point.

9. A projection image display apparatus for enlarging an image on a display surface with a projection lens and projecting the enlarged image onto a screen, wherein the projection lens comprises a first group of lenses having a negative power and a second group of lenses having a positive power, which are sequentially arranged from an enlargement side to a reduction side, wherein said projection lens arranged from an enlargement side to a reduction side, wherein said projection lens satisfies the following conditional expressions (1) through (4), and has a field angle of about 110° or more:

$$25.0 < Fb, \tag{1}$$

$$F < 0.65\ H, \tag{2}$$

$$30F < |EP|, \tag{3}$$

and $$4F < T, \tag{4}$$

where Fb is an air-converted distance from a final surface at the reduction side of the lens to an image point, H is a maximum image height at the reduction side, F is a focal distance of the whole projection lens, EP is a exit pupil distance, and T is an air-converted distance obtained by air-converting a gap between the first group of lenses and the second group of lenses.

* * * * *